No. 782,808. PATENTED FEB. 14, 1905.
A. M. GAINES.
NUT LOCK.
APPLICATION FILED FEB. 5, 1904.
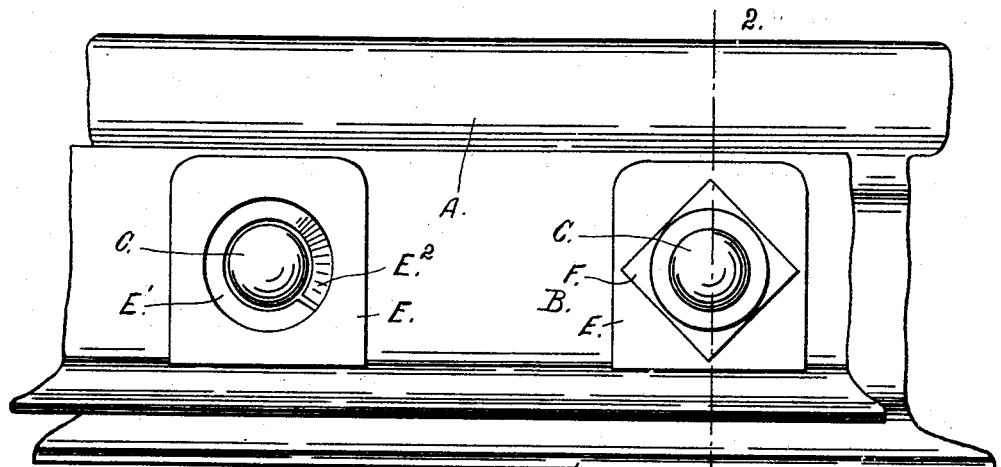
Fig. 1.
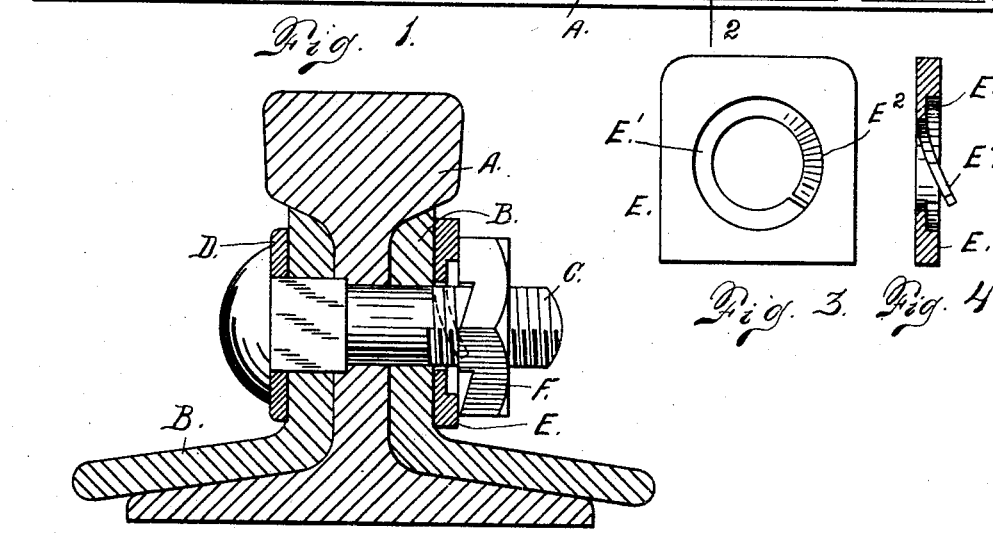
Fig. 2.
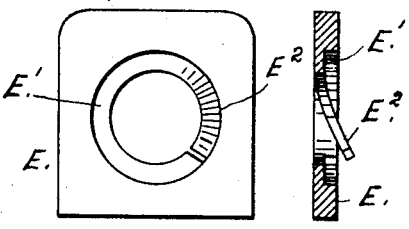
Fig. 3. Fig. 4.
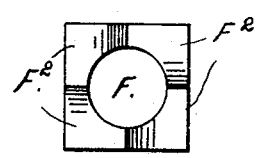
Fig. 6.
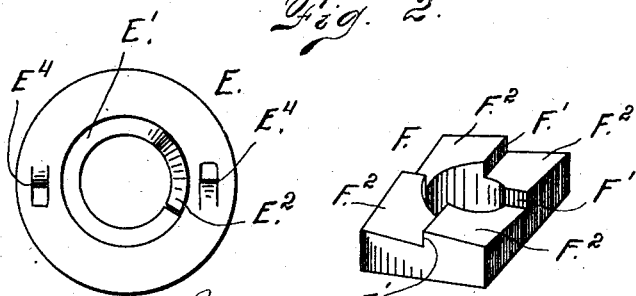
Fig. 7. Fig. 5.
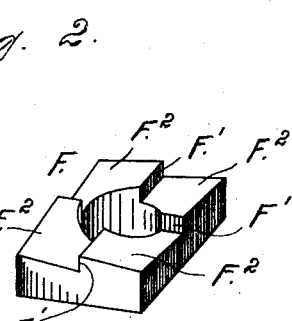
Witnesses
Otto E. Kuddick
Dena Nelson
A. M. Gaines
Inventor
By
Attorney No. 782,808.

Patented February 14, 1905.

UNITED STATES PATENT OFFICE.

ALFRED M. GAINES, OF DENVER, COLORADO.

NUT-LOCK.

SPECIFICATION forming part of Letters Patent No. 782,808, dated February 14, 1905.

Application filed February 5, 1904. Serial No. 192,206.

*To all whom it may concern:*

Be it known that I, ALFRED M. GAINES, a citizen of the United States of America, residing in the city and county of Denver and State of Colorado, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nut-locking devices, and while adapted more especially for use in connection with the fish-plates of railroad rail-joints it may be employed in other relations, as will be readily understood.

My object is to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a side elevation of a rail-joints, howing my improvement applied. Fig. 2 is a cross-section taken on the line 2 2, Fig. 1, the bolt and nut, however, being shown in elevation. Fig. 3 is a detail face view of my improved construction of washer. Fig. 4 is a section of the same. Fig. 5 is a perspective view of the nut used in connection with the said washer. Fig. 6 is a face view of the same. Fig. 7 is a detail face view of a washer, illustrating a modified form of construction.

The same reference characters indicate the same parts in all the views.

Let A designate a railroad-rail to the opposite sides of which are applied fish-plates B, the rail and fish-plates being provided with registering openings to receive a bolt C, whose head extremity engages an ordinary washer D. To the threaded extremity of the bolt opposite the washer D is applied a nut-locking washer E, which is recessed, as shown at E', and a spring-tongue $E^2$, punched from the bottom of the recessed portion, the said bottom being cut through to form the tongue $E^2$ in a manner that will be readily understood. Engaging the recessed face of this washer is a nut F, whose face adjacent the washer is provided with offsets F' and inclined faces $F^2$, the said faces being of slight inclination and the number of teeth or notches being such as to allow the tongue of the washer, with which the ratchet-face of the nut coöperates, to spring into place without interruption. It will be readily understood that where the ratchet-face of the nut is provided with a considerable number of teeth, making the inclined faces or bevels quite abrupt, the tongue of the washer is not given sufficient scope to spring into place to engage one tooth or offset, since the adjacent tooth or offset is in the way. Hence my improved nut is provided with few teeth, permitting the beveled faces to be of only slight inclination, thus allowing the tongue of the locking-washer sufficient scope for the purpose aforesaid.

By reason of my improved washer being recessed, as shown at E', and the tongue punched up from the bottom of the recess so that its upper extremity projects beyond the recessed face of the washer, the ratchet-face of the nut is only allowed to engage a small portion of the tongue, which thus retains its elasticity or spring after the nut has been screwed down tightly against the washer. If the tongue $E^2$ were punched upwardly from the face of the washer engaged by the ratchet-face of the nut, the latter as it is screwed to position would engage the tongue at its base or at the point where it is connected with the body of the washer, and by reason of this fact the tongue would be thrown to a perfectly straight position if the nut were screwed down tightly against the washer, with the result that the elasticity of the tongue would be injured or destroyed. By reason, however, of my improved construction of washer, whereby the nut only engages a small portion of the tongue and only forces the engaged portion down into the recess E' of the washer, the tongue is allowed to retain its elasticity or tension and can thus be relied upon to perform the locking function if an attempt is made to remove the nut.

From the foregoing description the use and operation of my improved nut-locking mechanism will be readily understood without further explanation in detail.

The construction of washer shown in Figs. 1 to 4, inclusive, is especially adapted for use in connection with fish-plates or other metal parts engaged by the washer. It is evident that my improved locking device is adapted for use with wooden parts as well as metal parts. The construction of washer especially adapted for use where the washer bears against wood is shown in Fig 7, in which the washer is provided with lips $E^4$, punched out of the washer and projecting beyond the face thereof opposite the nut-engaging face. When the nut is screwed down tightly against this washer, the lips $E^4$ are caused to enter the wood, whereby the washer is prevented from turning on the wood, and this locks the nut against turning on the bolt. In this construction of washer its outer edge may be of any desired shape. It is shown circular in the drawings; but in this construction it is evident that the outer contour of the washer is immaterial.

Having thus described the invention, what I claim is—

1. A nut-locking washer provided with a circular recess immediately surrounding the bolt-hole, a portion of the bottom of the recess being punched outwardly to form a locking-tongue, the free extremity of the said tongue normally projecting beyond the recessed face of the washer.

2. A nut-locking washer which is formed straight on one of its edges, its nut-engaging face being provided with a recess of suitable depth immediately surrounding the bolt-hole, the bottom of the recess being punched outwardly to form a nut-locking tongue whose free extremity extends beyond the nut-engaging face of the washer.

3. The combination with a bolt, a washer provided with a suitable bolt-hole, a recess immediately surrounding the bolt-hole, and a tongue punched outwardly from the recess, the free extremity of the tongue normally projecting beyond the nut-engaging face of the washer, and a nut having a ratchet-face adapted to coöperate with the locking-tongue of the washer, substantially as described.

4. The combination of a nut-locking washer having a recessed portion immediately surrounding the bolt-hole, and a tongue punched outwardly from the bottom of the recess, its free extremity normally projecting beyond the nut-engaging face of the washer, and a nut having a ratchet-face coöperating with the tongue of the washer for the purpose set forth.

In testimony whereof I affix my signature in presence of two witnesses.

ALFRED M. GAINES.

Witnesses:
 DENA NELSON,
 A. J. O'BRIEN.